US011313357B2

(12) United States Patent
Hsieh

(10) Patent No.: US 11,313,357 B2
(45) Date of Patent: Apr. 26, 2022

(54) INERTIAL ROTATION DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

(*) Notice: Subject to any disclaimer, the term of this patent is extended or adjusted under 35 U.S.C. 154(b) by 231 days.

(21) Appl. No.: 16/712,490

(22) Filed: Dec. 12, 2019

(65) Prior Publication Data

US 2020/0240397 A1 Jul. 30, 2020

(30) Foreign Application Priority Data

Jan. 30, 2019 (TW) .................................. 108103522

(51) Int. Cl.
*F03G 3/08* (2006.01)
*B25B 23/00* (2006.01)
*B25B 21/00* (2006.01)

(52) U.S. Cl.
CPC ............ *F03G 3/08* (2013.01); *B25B 23/0007* (2013.01); *B25B 21/00* (2013.01); *B25B 23/0035* (2013.01)

(58) Field of Classification Search
CPC ... F03G 3/08; B25B 23/0007; B25B 23/0035; B25B 21/00; B25B 21/02; B25B 13/06; B25B 23/147; B25B 23/1475; B25B 21/007; B25B 21/026; B25B 21/004; B25B 23/1405; B25B 23/1453
USPC ....... 81/121.1, 52, 124.6, 466; 173/93, 1, 90
See application file for complete search history.

(56) References Cited

U.S. PATENT DOCUMENTS

| 4,157,120 | A   | * | 6/1979  | Anderson | ............... | B25B 19/00 |
|           |     |   |         |          |                 | 173/93     |
| 6,745,652 | B2  | * | 6/2004  | Chen     | ................. | B25B 23/00 |
|           |     |   |         |          |                 | 81/177.85  |
| 8,931,377 | B2  | * | 1/2015  | Wang     | .................. | B25B 23/0035 |
|           |     |   |         |          |                 | 81/180.1   |
| 10,315,294 | B2 | * | 6/2019  | Rettler  | ................. | B25B 23/1475 |
| 10,625,403 | B2 | * | 4/2020  | Hsieh    | .................. | B25B 23/1405 |
| 2008/0041193 | A1 | * | 2/2008 | Baker    | ................... | B25B 13/102 |
|           |     |   |         |          |                 | 81/124.6   |
| 2014/0131157 | A1 | * | 5/2014 | Chih     | ........................ | F16D 41/16 |
|           |     |   |         |          |                 | 192/44     |
| 2014/0158388 | A1 | * | 6/2014 | Johnson  | ................. | B25B 21/026 |
|           |     |   |         |          |                 | 173/1      |
| 2018/0311800 | A1 | * | 11/2018 | Chu     | ........................ | B25B 21/02 |

(Continued)

*Primary Examiner* — Orlando E Aviles
*Assistant Examiner* — Jason Khalil Hawkins

(57) ABSTRACT

An inertial rotation device includes: a central member with an axial direction, a first engaging portion on the peripheral surface of the central member, an inertia member with a mounting hole, and a second engaging portion on the wall of the mounting hole. The inertia member is mounted around the central member and can be displaced between an engaging position and a released position along the axial direction of the central member. The inertia member can rotate together with the central member when at the engaging position, where the two engaging portions are engaged with each other, and cannot rotate together with the central member when at the released position, where the two engaging portions are disengaged from each other. The magnitude of the torque of the inertial rotation device can be changed by switching the inertia member to the engaging position or the released position.

10 Claims, 6 Drawing Sheets

(56) References Cited

U.S. PATENT DOCUMENTS

2019/0126447 A1\* 5/2019 Chu ..................... B25B 21/023
2019/0202037 A1\* 7/2019 Chern .................... B25B 17/02

\* cited by examiner

INERTIAL ROTATION DEVICE

BACKGROUND OF THE INVENTION

1. Technical Field

The present invention relates to a transmission device and more particularly to an inertial rotation device capable of providing an additional moment of inertia.

2. Description of Related Art

Handheld power tools such as pneumatic or electric torque wrenches are often used in conjunction with a socket in order to rotate a bolt, a nut, or other threaded fasteners. To increase the torque with which a power tool tightens or loosens a threaded fastener via a socket, it is common practice to form an inertia portion on the outer periphery of the socket, wherein the inertia portion has a larger outer diameter than the socket and is intended to produce an additional moment of inertia that results in a larger torque than achievable without the inertia portion.

While a socket with an inertia portion can generate a larger torque, some threaded fasteners need not be tightened with an augmented torque but require to be operated with an ordinary socket. Therefore, one who plans to rotate threaded fasteners of different tightening requirements may have to switch between ordinary sockets and sockets with an inertia portion repeatedly, which is nevertheless time-consuming and inconvenient, not to mention that a change of sockets may present difficulties under certain circumstances. The issue to be addressed by the present invention is to eliminate the need to switch between sockets configured for different torques.

BRIEF SUMMARY OF THE INVENTION

One objective of the present invention is to provide an inertial rotation device that has an inertia portion for providing a moment of inertia. The inertia portion of the inertial rotation device is configured to involve in torque generation only when needed, thereby allowing the inertial rotation device to adapt to different torque requirements.

Another objective of the present invention is to provide an inertial rotation device whose torque can be changed through a simple operation.

The present invention provides an inertial rotation device that includes:

a central member with an axial direction, two ends, and a first engaging portion provided on the peripheral surface of the central portion, wherein the central member is configured to rotate about the axial direction; and an inertia member formed as an annular body, the inertia member has a mounting hole and has a second engaging portion provided on the wall of the mounting hole; the inertia member is mounted around the central member (i.e., the central member is inserted through the mounting hole of the inertia member) and can be displaced along the axial direction of the central member between an engaging position and a released position; when the inertia member is at the engaging position, the first engaging portion is engaged with the second engaging portion such that the inertia member and the central member can be rotated in unison; and when the inertia member is at the released position, the first engaging portion is disengaged from the second engaging portion such that the inertia member and the central member cannot be rotated in unison.

When the inertia member is engaged with the central member, the moment of inertia of the inertia member will be added to that of the central member, allowing the inertial rotation device to generate a larger torque than when the inertia member is not engaged with the central member. Thus, the magnitude of the torque of the inertial rotation device can be easily changed by switching the inertia member to the engaging position or the released position, without having to switch to a different rotation device.

Preferably, the inertial rotation device further includes a positioning assembly provided between the inertia member and the central member to position the inertia member at the engaging position or the released position.

Preferably, the inertial rotation device further includes an inner ring rotatably provided between the inertia member and the central member.

Preferably, the inertial rotation device further includes a rolling assembly provided between the inner ring and the inertia member. When the inertia member and the inner ring are rotated with respect to each other, the rolling assembly can reduce the rotational friction between the inertia member and the inner ring.

BRIEF DESCRIPTION OF THE SEVERAL VIEWS OF THE DRAWINGS

Two preferred embodiments of the present invention will be presented below and detailed with reference to the accompanying drawings, in which.

DETAILED DESCRIPTION OF THE INVENTION

Please refer to FIG. 1 and FIG. 2 for the inertial rotation device 10 according to the first preferred embodiment of the present invention (hereinafter also referred to as the rotation device for short). The rotation device 10 includes a central member 20 and an inertia member 40. The technical means of the invention are intended to establish a releasable engagement between the central member 20 and the inertia member 40 so that the two members 20 and 40 can enter the engaged state shown in FIG. 3 and the disengaged state shown in FIG. 5 and be switched between the states shown respectively in FIG. 3 and FIG. 5.

Figure 2:
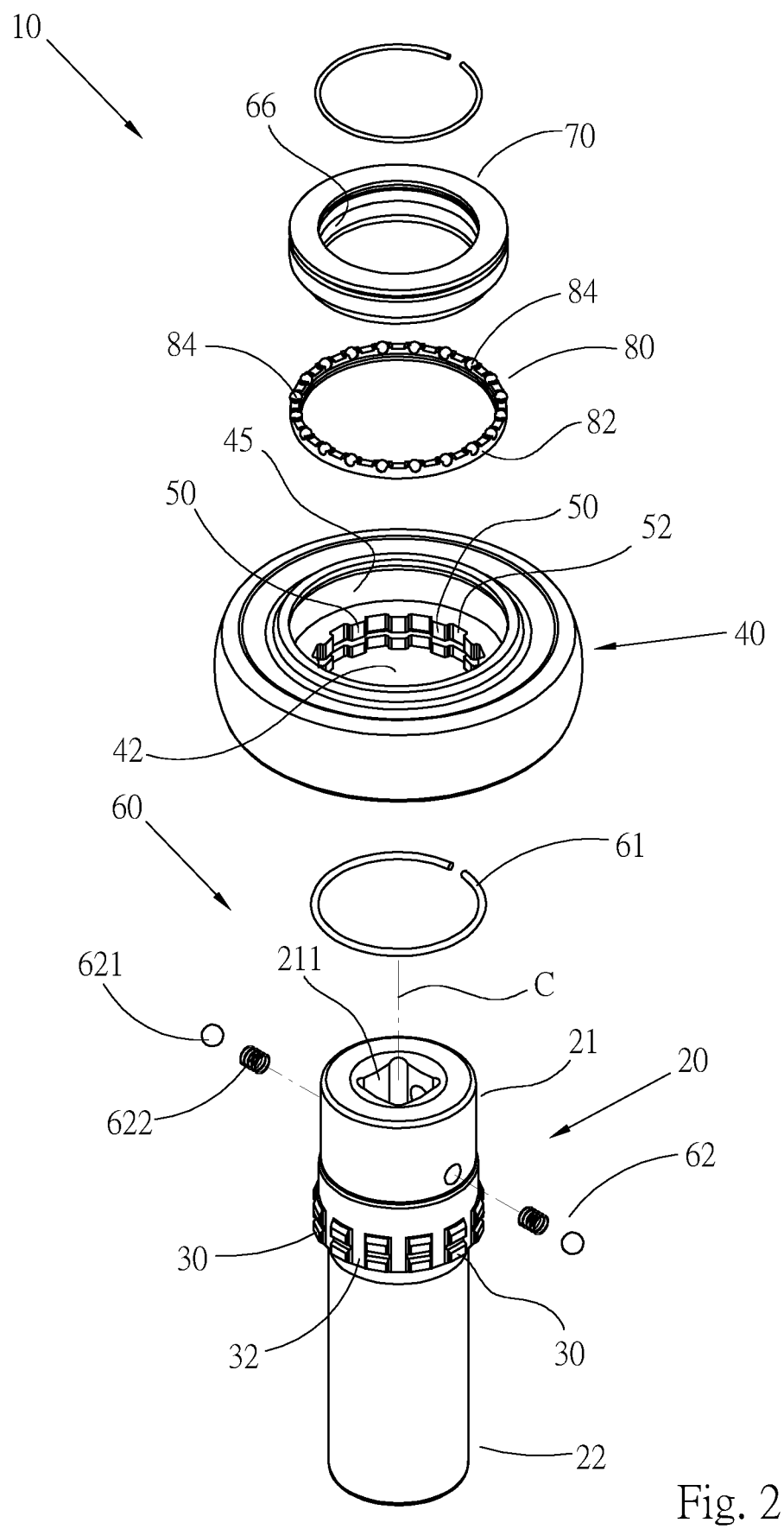
FIG. 2 is an exploded perspective view of the inertial rotation device in FIG. 1.
Figure 3:
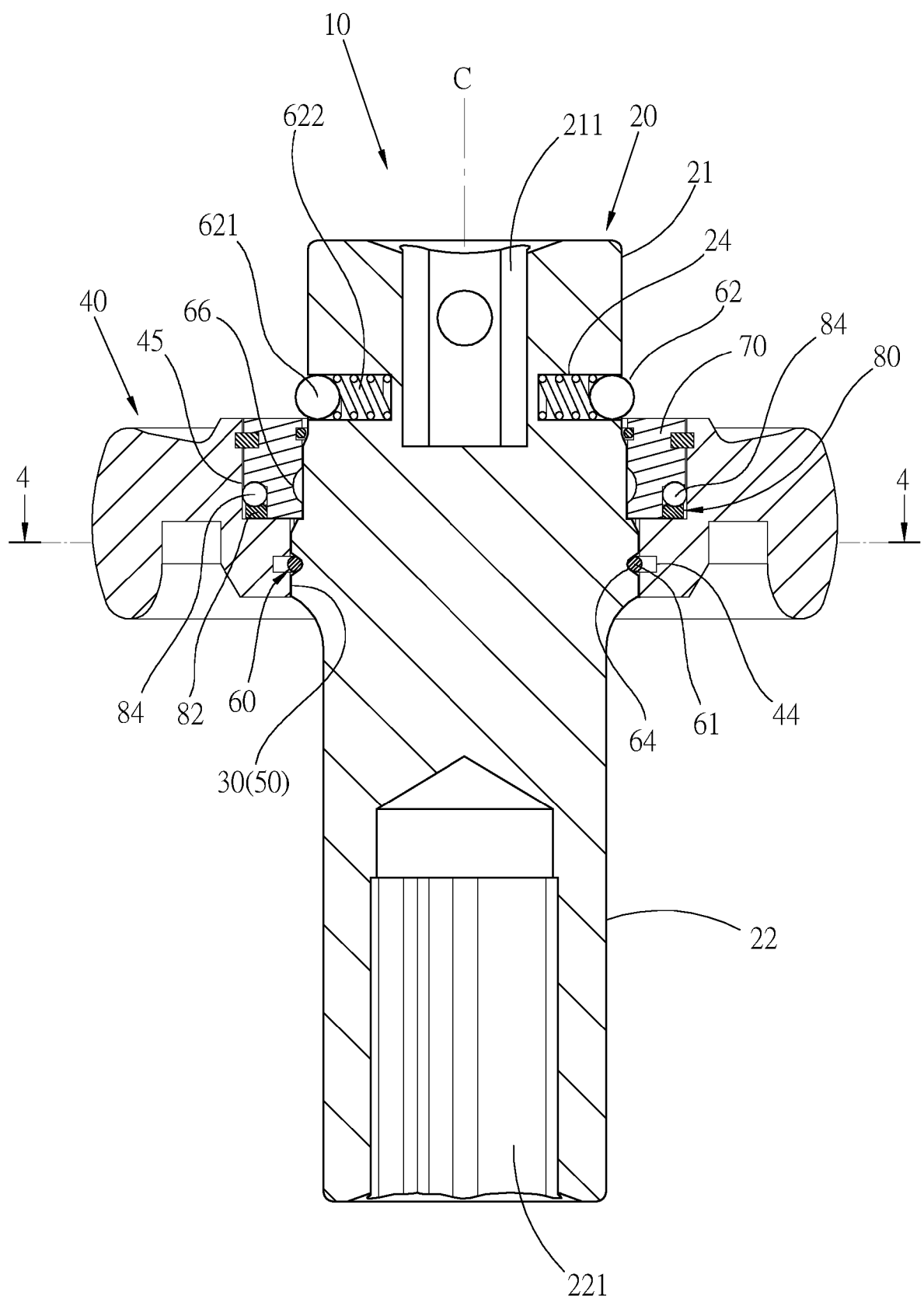
FIG. 3 is a sectional view taken along section line 3-3 in FIG. 1, showing a state in which the central member and the inertia member engaged with each other.

Referring to FIG. 2 and FIG. 3, the central member 20 is configured as an ordinary socket, is cylindrical in shape, and has an axial direction C. During use, the central member 20 is rotated about the axial direction C. The central member 20 has two ends, namely a first end 21 and a second end 22. The first end 21 is the driven end, has a polygonal hole 211, and is configured to be driven by a power tool. The second end 22 is the driving end, has a polygonal hole 221, and is configured to drive a threaded fastener such as a bolt or a nut. The socket type of the central member 20 is not limited to that shown in the drawings of this embodiment.

An annular first engaging portion is provided on the peripheral surface of the central member 20. In this preferred embodiment, the first engaging portion is formed by a plurality of first engaging teeth 30, and the first engaging teeth 30 are arranged at intervals along the circumference, and on the peripheral surface, of the central member.

The inertia member 40 is an annular body, has an outer diameter larger than that of the central member 20, and forms a mounting hole 42 that passes through two ends of the inertia member 40. An annular second engaging portion is provided on the wall of the mounting hole 42. In this preferred embodiment, the second engaging portion is formed by a plurality of second engaging teeth 50, and the second engaging teeth 50 are arranged at intervals along the circumference, and on the wall, of the mounting hole 42. The wall of the mounting hole 42 of the inertia member 40 is further provided with an annular chamber 45.

Figure 1:
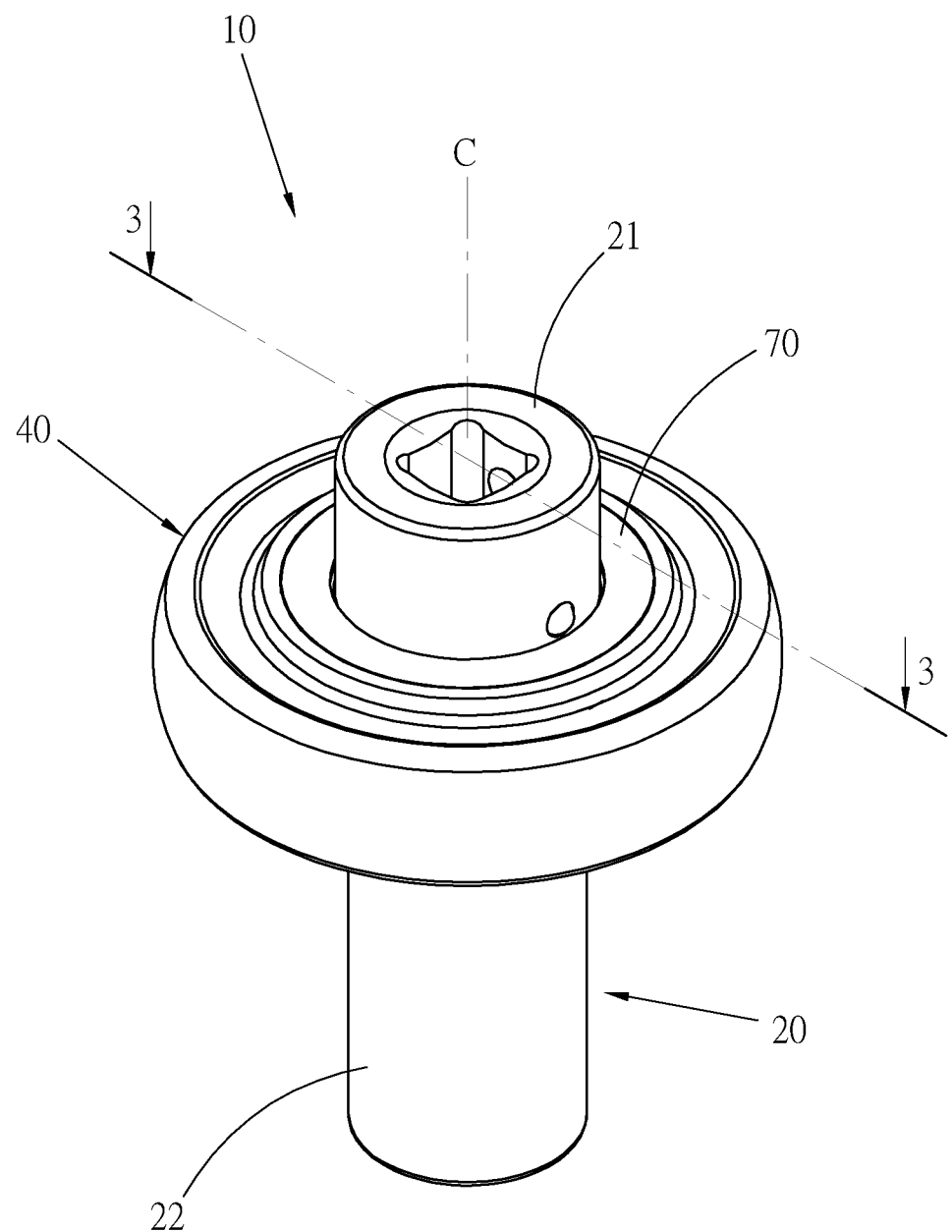
FIG. 1 is a perspective view of the inertial rotation device according to the first preferred embodiment of the invention.
Figure 5:
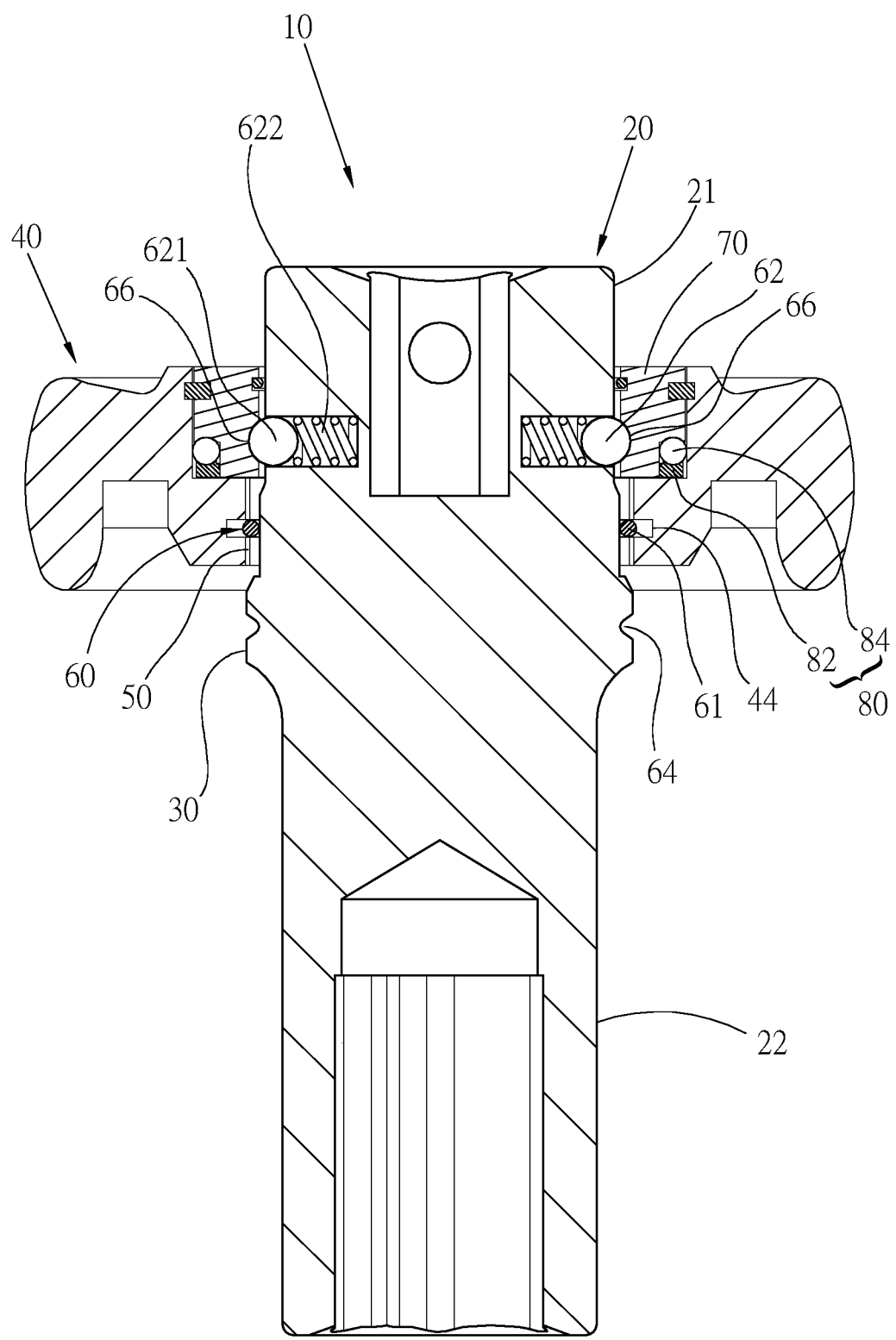
FIG. 5 is similar to FIG. 3 showing that the central member and the inertia member do not engage with each other.

The mounting holes 42 of the inertia member 40 is fitted on the central member 20 as shown in FIG. 1 and can be displaced between an engaging position and a released position along the axial direction C of the central member. Referring to FIG. 3, when the inertia member 40 is displaced to the engaging position, the second engaging portion (i.e., the second engaging teeth 50) of the inertia member 40 engages with the first engaging portion (i.e., the first engaging teeth 30) of the central member 20, so the central member can drive the inertia member to rotate simultaneously with the central member. When the inertia member 40 is displaced to the released position as shown in FIG. 5, the second engaging teeth 50 (i.e., the second engaging portion) of the inertia member 40 are separated from, and hence no longer engaged with, the first engaging teeth 30 (i.e., the first engaging portion) of the central member 20; as a result, the central member 20 and the inertia member 40 are in a state in which they can move with respect to each other, i.e., the central member 20 rotates without driving the inertia member 40 to rotate along with it.

Figure 4:
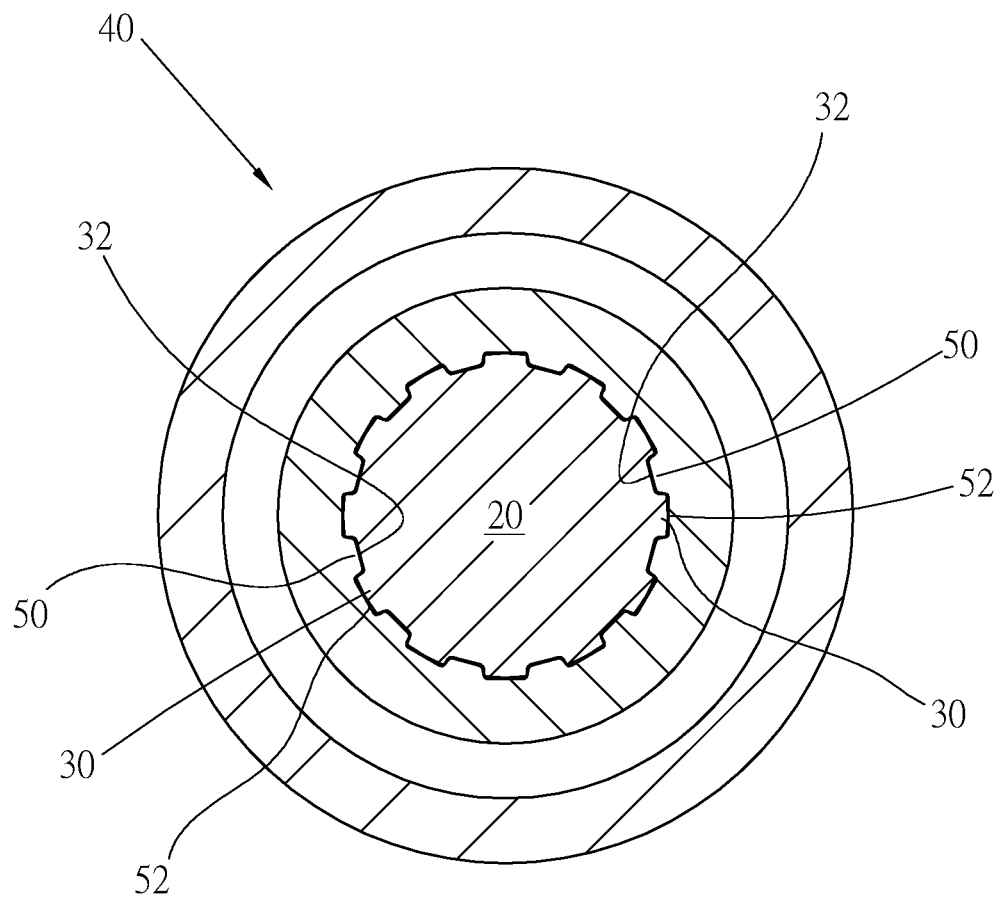
FIG. 4 is a sectional view taken along section line 4-4 in FIG. 3.

Referring to FIG. 4, when the first engaging teeth 30 engage with the second engaging teeth 50, each first engaging tooth 30 is in a second groove 52 formed between two adjacent second engaging teeth 50, and each second engaging tooth 50 is in a first groove 32 formed between two adjacent first engaging tooth 30.

In order to position the inertia member precisely at the engaging position or the released position, the inertial rotation device of the present invention preferably includes a positioning assembly 60. Referring to FIG. 3 and FIG. 5, the positioning assembly 60 in this preferred embodiment includes one or more elastic positioning members (e.g., positioning members 61 and 62) and one or more positioning grooves (e.g., positioning grooves 64 and 66). In this embodiment, there are two positioning members and two positioning grooves. The two positioning members 62 and 61 are provided at the peripheral surface of the central member 20 and the inner peripheral surface of the inertia member 40 respectively. The two positioning grooves 66 and 64 in this embodiment are annular grooves and are provided in the inner peripheral surface of the inertia member 40 and the peripheral surface of the central member 20 respectively. When the inertia member 40 is at the engaging position, the first positioning member 61 is elastically engaged in the first positioning groove 64; and when the inertia member 40 is at the released position, the second positioning member 62 is elastically engaged in the second positioning groove 66. The first positioning member 61 in this embodiment is a C-shaped retainer provided in a furrow 44 in the inner peripheral surface of the inertia member 40, and the first positioning groove 64 is provided in the peripheral surface of the central member 20. The second positioning member 62 in this embodiment is formed by at least one positioning ball 621 and at least one elastic member 622. More specifically, the second positioning member 62 in this embodiment is formed by two positioning balls 621 and two elastic members 622 and is divided into two units each including one positioning ball 621 and one elastic member 622. Each positioning ball-and-elastic member unit is mounted in a hole 24 in the peripheral surface of the central member 20. The second positioning groove 66 is provided in the inner peripheral surface of the inertia member 40. When the first positioning member 61 is elastically engaged in the first positioning groove 64 as shown in FIG. 3, the inertia member 40 is elastically positioned at the engaging position. When the second positioning member 62 is elastically engaged in the second positioning groove 66 as shown in FIG. 5, the inertia member is elastically positioned at the released position. It is understood that the first positioning groove and the first positioning member may swap positions; in other words, the first positioning member may be provided at the peripheral surface of the central member, and the first positioning groove, in the inner peripheral surface of the inertia member. Similarly, the second positioning member and the second positioning groove may swap positions. When any of the positioning grooves and the corresponding positioning member swap positions, the intended positioning effect can still be achieved.

The first preferred embodiment of the present invention further has an inner ring 70. The inner ring 70 has an inner diameter larger than the outer diameter of the central member 20 and has an outer diameter smaller than the inner diameter of the inertia member 40. The inner ring 70 is mounted in the annular chamber 45 of the inertia member 40 in a way that allows the inner ring 70 to rotate with respect to the inertia member 40 without coming off the inertia member (e.g., both the inner ring and the inertia member are retained by a retaining member). The inner ring 70 is mounted between the central member and the inertia member and, in addition to rotating with respect to the inertia member 40, can be displaced together with the inertia member along the axial direction of the central member. The inner peripheral surface of the inner ring 70 forms a portion of the inner peripheral surface of the inertia member 40, and the second positioning groove 66 is provided in the inner peripheral surface of the inner ring 70; thus, the second positioning groove is provided in the inner peripheral surface of the inertia member as previously defined. The inertial rotation device in this embodiment further includes a rolling assembly 80 that includes an annular base 82 and a plurality of rolling members such as rolling balls 84. The rolling balls 84 are mounted on the base 82 at intervals. The rolling assembly 80 is provided in the annular chamber 45 (such as, but not limited, on the bottom wall of the annular chamber 45 as shown in the drawings), lies between the inertia member 40 and the inner ring 70, and is in contact with a wall surface of the inertia member 40 and a wall surface of the inner ring 70, in order for the rolling balls 84 to reduce the friction generated by rotation of the inner ring 70.

The present invention is designed to be used in conjunction with a power tool. Once the first end 21 of the inertial rotation device is connected to the power tool and the second end 22 is connected to a threaded fastener, the power tool can be used to tighten or loosen the threaded fastener via the inertial rotation device. When it is desired to rotate the threaded fastener with a relatively large torque, the user may push the inertia member 40 toward the second end 22 (i.e., the driving end) of the central member 20 until the first positioning member 61 is elastically engaged in the first positioning groove 64 as shown in FIG. 3, thereby positioning the inertia member 40 at the engaging position, where the inertia member 40 engages with the central member 20. When the central member is rotated, the inertia member 40 is rotated along with the central member, and the moment of inertia of the inertia member is added to that of the central member so that the rotation device 10 can rotate the threaded fastener with a larger torque.

Conversely, when it is desired to rotate the threaded fastener with a relatively small torque applied by the rotation device 10, the user may push the inertia member 40 toward the first end 21 of the central member 20 so that the first positioning member 61 is disengaged from the first positioning groove 64 and the second positioning member 62 is elastically engaged in the second positioning groove 66 as shown in FIG. 5, thereby positioning the inertia member 40 at the released position, where the second engaging teeth 50 of the inertia member 40 do not engage with the first engaging teeth 30 of the central member. When the central member 20 is rotated, the inertia member 40 will not rotate along with the central member; as a result, the rotation device 10 rotates the threaded fastener mainly with the torque of the central member 20. When the inertia member is at the released position as shown in FIG. 5, rotation of the central member 20 will not lead to rotation of the inertia member 40, and the rolling balls 84 of the rolling assembly 80 help reduce the friction between the central member 20 and the inertia member 40 when the central member 20 is rotated with respect to the inertia member 40. Moreover, when the inertia member is at the released position as shown in FIG. 5, the inner periphery of the inertia member (or the inner periphery of the inner ring to be exact) is supported by the positioning balls 621 of the second positioning member 62.

Figure 6:
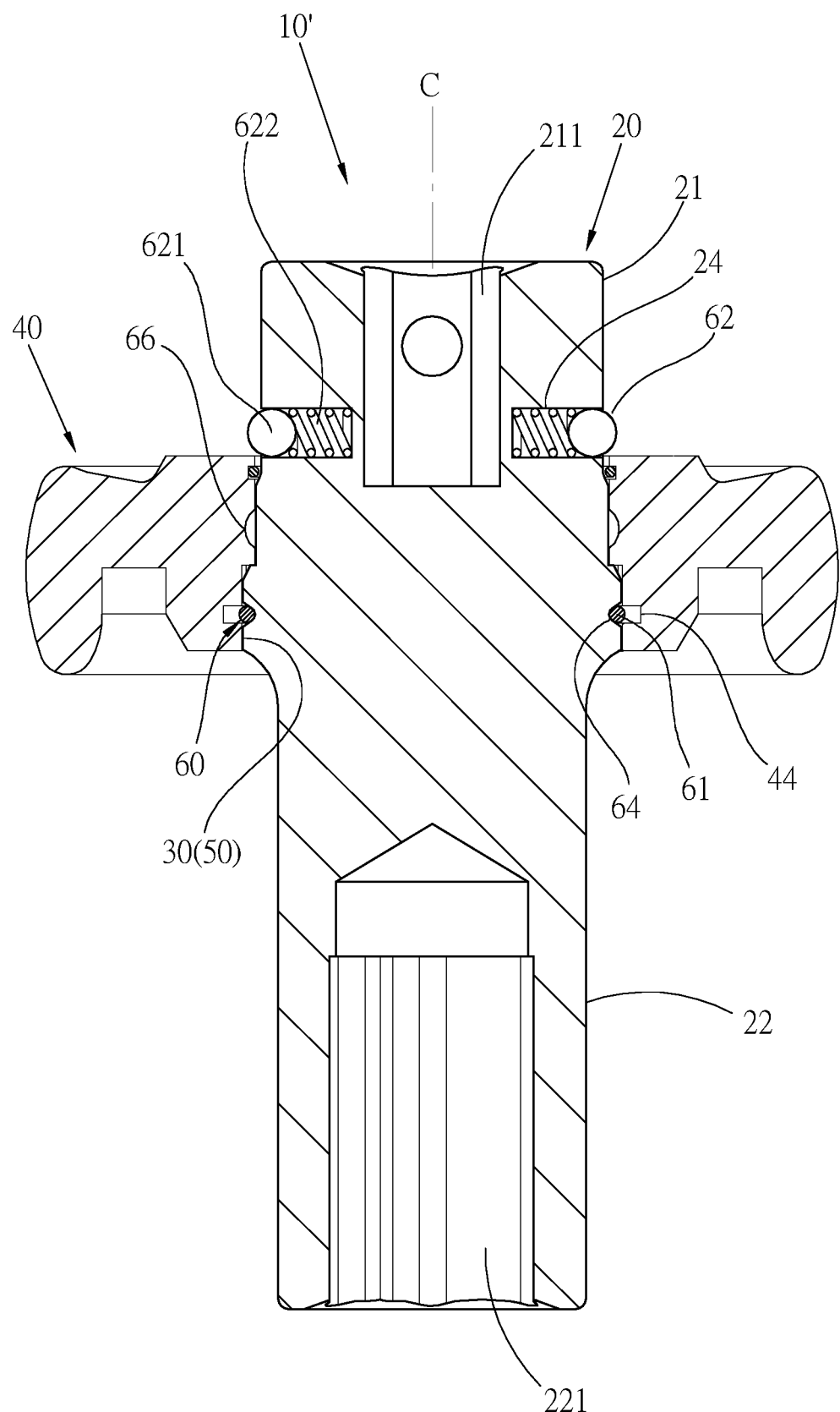
FIG. 6 is a longitudinal sectional view of the inertial rotation device according to the second preferred embodiment of the invention.

FIG. 6 shows the inertial rotation device 10' according to the second preferred embodiment of the present invention. To facilitate understanding, the same components in the first and the second preferred embodiments are indicated by the same reference numeral and, for the sake of brevity, will not be described repeatedly. FIG. 6 is generally the same as FIG. 3 and shows the central member 20 and the inertia member 40 in the engaging state, in which the inertia member can rotate along with the central member in order for the inertial rotation device 10' to have a relatively large moment of inertia. In this state, the first positioning member 61 is engaged in the first positioning groove 64 to position the inertia member at the engaged position. By moving the inertia member 40 toward the first end 21 of the central member 20, the first positioning member 61 can be disengaged from the first positioning groove 64, and the second positioning member 62 can be engaged in the second positioning groove 66, thus bringing the central member 20 and the inertia member 40 out of the engaging state. This embodiment dispenses with the inner ring in the first preferred embodiment, so the second positioning groove 66 is provided directly in the inner peripheral surface of the inertia member 40.

The inertial rotation device 10 of the present invention allows the position of the inertia member 40 to be changed with ease and therefore features convenience of use. One who is trying to rotate a threaded fastener with the inertial rotation device of the invention only has to position the inertia member at the engaging position, and the threaded fastener can be rotated with a relatively large torque. Conversely, the threaded fastener can be rotated with an ordinary, or relatively small, torque when the inertia member is positioned at the released position. To change the torque to be applied, all that needs to be done is push and thereby displace the inertia member along the axial direction of the central member; the inertial rotation device need not be changed at all. Thus, the invention provides an effective solution to the inconvenience and drawback associated with the necessity to switch between different sockets as is typically the case with the prior art.

It should be pointed out that the inertia member can be positioned at the engaging position and the released position by one positioning member that works selectively with two positioning grooves or by two positioning members that work with one positioning groove, and that the positioning member(s) and the positioning groove(s) may be provided at or in the inner peripheral surface of the inertia member and the peripheral surface of the central member respectively or vice versa. For example, when a single positioning member is to be used in conjunction with two positioning grooves, the positioning member may be provided at one of the inner peripheral surface of the inertia member and the peripheral surface of the central member, and the two positioning grooves, in the other of the inner peripheral surface of the inertia member and the peripheral surface of the central member.

What is claimed is:

1. An inertial rotation device, comprising:
a central member having an axial direction and two ends;
a first engaging portion provided on a peripheral surface of the central member, the central member is configured to rotate about the axial direction; and
an inertia member formed as an annular body, the inertia member having a mounting hole passing through the inertia member and has a second engaging portion provided on a wall defining the mounting hole; the mounting hole is fitted on the central member and the inertia member is displaceable between an engaging position and a released position along the axial direction of the central member; when the inertia member is at the engaging position, the inertia member is located around and connected to the central member and the first engaging portion is engaged with the second engaging portion to enable simultaneous rotation of the inertia member and the central member; and when the inertia member is at the released position, the inertia member is located around and connected to the central member and the first engaging portion is disengaged from the second engaging portion to prevent simultaneous rotation of the inertia member and the central member.

2. The inertial rotation device of claim 1, wherein the first engaging portion is provided on the peripheral surface of the central member in an annular configuration, and the second engaging portion is provided on the wall defining the mounting hole in an annular configuration too.

3. The inertial rotation device of claim 2, wherein the first engaging portion is a plurality of first engaging teeth provided on the peripheral surface of the central member, and the second engaging portion is a plurality of second engaging teeth provided on the wall of the mounting hole.

4. The inertial rotation device of claim 1, further comprising a positioning assembly provided between the central member and the inertia member to position the inertia member at the engaging position or the released position.

5. The inertial rotation device of claim 4, wherein the positioning assembly has at least one positioning member and at least one positioning groove provided on the peripheral surface of the central member and an inner peripheral surface of the inertia member respectively; and the positioning member is engaged in the positioning groove when the inertia member is at the engaging position or the released position.

6. The inertial rotation device of claim 4, wherein the positioning assembly has a first positioning member, a second positioning member, a first positioning groove, and a second positioning groove, the first positioning member is provided at an inner peripheral surface of the inertia member, the first positioning groove is provided in the peripheral surface of the central member; the second positioning member is provided at the peripheral surface of the central member, and the second positioning groove is provided in the inner peripheral surface of the inertia member; and when the inertia member is at the engaging position, the first positioning member is elastically engaged in the first positioning groove, and when the inertia member is at the released position, the second positioning member is elastically engaged in the second positioning groove.

7. The inertial rotation device of claim 1, further comprising an inner ring rotatably provided between the inertia member and the central member.

8. The inertial rotation device of claim 7, wherein the inertia member has an inner peripheral surface provided with an annular chamber, and the inner ring is provided in the annular chamber and is rotatable with respect to the inertia member.

9. The inertial rotation device of claim 8, further comprising a rolling assembly with a plurality of rolling members, wherein the rolling assembly is provided in the annular chamber and is located between the inner ring and the inertia member.

10. The inertial rotation device of claim 7, further comprising a positioning assembly, the positioning assembly has a first positioning member, a second positioning member, a first positioning groove, and a second positioning groove, the first positioning member is provided at an inner peripheral surface of the inertia member, the first positioning groove is provided in the peripheral surface of the central member; the second positioning member is provided at the peripheral surface of the central member, and the second positioning groove is provided in an inner peripheral surface of the inner ring; and when the inertia member is at the engaging position, the first positioning member is elastically engaged in the first positioning groove, and when the inertia member is at the released position, the second positioning member is elastically engaged in the second positioning groove.

* * * * *